United States Patent
McCloskey et al.

(10) Patent No.: US 8,702,003 B2
(45) Date of Patent: Apr. 22, 2014

(54) BAR CODE READERS AND METHODS OF READING BAR CODES

(75) Inventors: Scott McCloskey, Minneapolis, MN (US); Sharath Venkatesha, Golden Valley, MN (US); Kelly Muldoon, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 151 days.

(21) Appl. No.: 13/300,223

(22) Filed: Nov. 18, 2011

(65) Prior Publication Data
US 2013/0126615 A1  May 23, 2013

(51) Int. Cl.
*G06K 7/10* (2006.01)
(52) U.S. Cl.
USPC .................. 235/462.25; 235/462.24
(58) Field of Classification Search
USPC ............ 235/462.24, 462.25, 462.26
See application file for complete search history.

(56) References Cited

U.S. PATENT DOCUMENTS

| | | | |
|---|---|---|---|
| 6,227,265 B1 * | 5/2001 | Skell et al. | 141/198 |
| 7,128,270 B2 * | 10/2006 | Silverbrook et al. | 235/472.01 |
| 7,331,523 B2 * | 2/2008 | Meier et al. | 235/462.25 |
| 2009/0244300 A1 | 10/2009 | Levin et al. | |

OTHER PUBLICATIONS

McCloskey, et al., Motion Invariance and Custom Blur from Lens Motion, IEEE International Conference on Computational Photography (ICCP), Pittsburgh, PA, Apr. 8-10, 2011 (8 pgs.).
Taeg Sang Cho, et al., Motion blur removal with orthogonal parabolic exposures, IEEE International Conference on Computational Photography (ICCP), Cambridge, MA, Mar. 28-30, 2010 (8 pgs.).

* cited by examiner

*Primary Examiner* — Daniel St Cyr
(74) *Attorney, Agent, or Firm* — Brooks, Cameron & Huebsch, PLLC

(57) ABSTRACT

Bar code readers and methods of reading bar codes are described herein. One device includes a camera configured to produce a motion invariant image of a bar code while the bar code is in motion and a processor configured to deblur the motion invariant image of the bar code.

19 Claims, 1 Drawing Sheet

BAR CODE READERS AND METHODS OF READING BAR CODES

TECHNICAL FIELD

The present disclosure relates to bar code readers and methods of reading bar codes.

BACKGROUND

A bar code is a representation of data, such as, for instance, an optical machine-readable representation of data. For example, a bar code can represent data using a number of parallel lines and/or the spacing between the lines. Such a bar code can be referred to as a one-dimensional bar code.

As an additional example, a bar code can represent data using a number of geometrical shapes and/or patterns, such as, for instance, squares, dots, and/or hexagons, among other geometrical shapes and/or patterns. Such a bar code can be referred to as a two-dimensional bar code.

A bar code can be used to represent data associated with an object, among other uses. For example, a bar code representing data associated with an object can be placed on the object (e.g., on the packaging or container of the object). The bar code can then be used to recognize and/or track the object in a retail and/or shipping environment, for example.

A bar code reader can be used to read a bar code (e.g., to recognize the bar code and/or identify the data represented by the bar code). Reading a bar code can include, for example, creating and/or capturing an image of the bar code.

In some instances, however, a bar code reader may fail (e.g., the bar code reader may not be able to read the bar code), and the bar code may have to be re-read (e.g., the image of the bar code may need to be re-created and/or re-captured). Having to re-read the bar code can interrupt the workflow of a retail and/or shipping environment, which can be time-consuming and/or costly.

A failed bar code reading may be caused by, for example, motion blur. Motion blur can occur, for instance, if the bar code (e.g., the object on which the bar code is placed) is in motion while the bar code is read by the bar code reader. For example, if the bar code is in motion while the bar code is read, the image of the bar code may include motion blur, which can render the bar code unreadable.

In some previous approaches, a bar code reading failure due to motion blur can be prevented by estimating and/or determining the motion blur (e.g., the amount and/or point spread function of the motion blur) in the image of the bar code. The image of the bar code can be deblurred based on the estimated and/or determined motion blur, and the deblurred image of the bar code can then be read. However, estimating and/or determining the motion blur in an image of a bar code can be difficult, time-consuming, and/or costly.

DETAILED DESCRIPTION

Bar code readers and methods of reading bar codes are described herein. For example, one or more embodiments include a camera configured to produce a motion invariant image of a bar code while the bar code is in motion and a processor configured to deblur the motion invariant image of the bar code.

Bar code readers in accordance with one or more embodiments of the present disclosure may not fail due to, for example, motion blur. That is, bar code reading failures caused by motion blur can be prevented by reading bar codes in accordance with one or more embodiments of the present disclosure. Preventing bar code reading failures caused by motion blur can prevent interruptions to the workflow of a retail and/or shipping environment, which can save time and/or money, among other benefits.

Additionally, in one or more embodiments of the present disclosure, bar code reading failures caused by motion blur can be prevented without having to estimate and/or determine the motion blur (e.g., the amount and/or point spread function of the motion blur) in the image of the bar code. That is, bar code readers in accordance with one or more embodiments of the present disclosure can prevent bar code reading failures caused by motion blur without estimating and/or determining the motion blur in the image of the bar code. Accordingly, bar code readers in accordance with one or more embodiments of the present disclosure can prevent bar code reading failures caused by motion blur easier, faster, and/or cheaper than previous bar code readers.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of bar codes" can refer to one or more bar codes.

Figure 1:
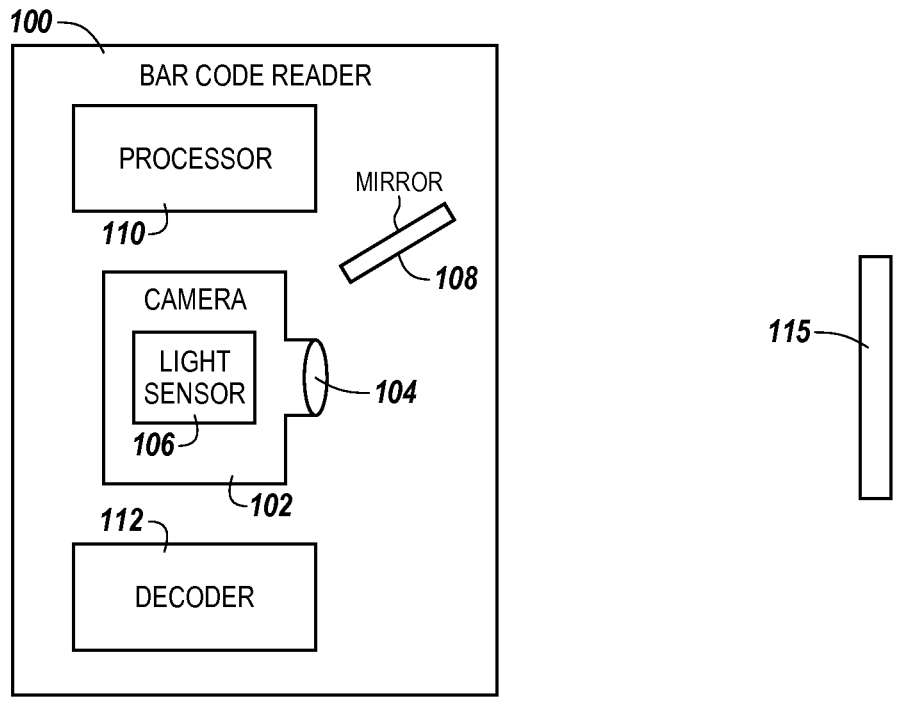
FIG. 1 illustrates a bar code reader in accordance with one or more embodiments of the present disclosure.

FIG. 1 illustrates a bar code reader 100 in accordance with one or more embodiments of the present disclosure. Bar code reader 100 can be used to read (e.g., recognize and/or identify data represented by) a bar code such as, for instance, bar code 115 illustrated in FIG. 1. Bar code 115 can be, for example, a one-dimensional or a two-dimensional bar code. In some embodiments, bar code 115 can be on an object (e.g., on the packaging or container of the object; not shown in FIG. 1 for clarity and so as not to obscure embodiments of the present disclosure).

As shown in FIG. 1, bar code reader 100 includes a camera 102. Camera 102 can be, for example, a digital camera. Camera 102 can include a lens 104 and a light (e.g., visible light) sensor 106, as illustrated in FIG. 1. Additionally, as shown in FIG. 1, bar code reader 100 can include a mirror 108 associated with camera 102. Mirror 108 can be, for example, a movable mirror.

In the embodiment illustrated in FIG. 1, mirror 108 is separate from (e.g., outside) camera 102. However, embodiments of the present disclosure are not so limited. For example, in some embodiments, camera 102 can include mirror 108 (e.g., mirror 108 can be coupled to and/or included in camera 102). Camera 102 can also include additional portions and/or elements not shown in FIG. 1 for clarity and so as not to obscure embodiments of the present disclosure (as will be understood by one of skill in the art).

Camera 102 can produce (e.g., capture, acquire, and/or generate) a motion invariant image of bar code 115 while bar code 115 is in motion. For example, mirror 108 can reflect light from bar code 115 to camera 102, and camera 102 can produce the motion invariant image of bar code 115 using the reflected light.

The motion of bar code 115 can, for example, correspond to the motion of the object which bar code 115 is on. For instance, the object may be on a moving conveyor belt traveling in a particular direction and/or may be being moved across the field of view of bar code reader 100. However, embodiments of the present disclosure are not limited to a particular type of motion for bar code 115.

The motion invariant image of bar code 115 is an image of bar code 115 having a motion blur (e.g., an amount and/or point spread function of the motion blur) that does not depend on the motion (e.g., velocity) of bar code 115. That is, the motion invariant image of bar code 115 is a blurred image of bar code 115 that has the same motion blur (e.g., the same amount and/or point spread function of the motion blur) regardless of the motion (e.g., velocity) of bar code 115.

In some embodiments, camera 102 can produce the motion invariant image of bar code 115 while camera 102 (e.g., the whole camera) is in motion. In some embodiments, the motion of camera 102 can be controlled by, for example, a mechanical and/or electrical motion control system (not shown in FIG. 1 for clarity and so as not to obscure embodiments of the present disclosure) that can be separate from, coupled to, and/or included in camera 102 and/or bar code reader 100.

The motion of camera 102 can, for example, have a constant acceleration. Additionally and/or alternatively, the motion of camera 102 can be based, at least in part, on the motion of bar code 115 (e.g., the predicted and/or expected motion of bar code 115). For example, the motion of camera 102 can be aligned with the motion of bar code 115 (e.g., the predicted and/or expected motion of bar code 115). For instance, the speed and/or direction of the motion of camera 102 can be approximately equal to the speed and/or direction, respectively, of the motion of bar code 115. That is, camera 102 can produce the motion invariant image of bar code 115 while moving at approximately the same speed as and/or in approximately the same direction as bar code 115. However, embodiments of the present disclosure are not limited to a particular type of motion for camera 102.

In some embodiments, camera 102 can produce the motion invariant image of bar code 115 while a portion of camera 102 is in motion (e.g., while one or more, but not all, elements of camera 102 are in motion). For example, camera 102 can produce the motion invariant image of bar code 115 while lens 104, light sensor 106, and/or mirror 108 are in motion. In some embodiments, the motion of lens 104, light sensor 106, and/or mirror 108 can be controlled by, for example, a mechanical and/or electrical motion control system (not shown in FIG. 1 for clarity and so as not to obscure embodiments of the present disclosure) that can be separate from, coupled to, and/or included in camera 102 and/or bar code reader 100.

The motion of the portion of camera 102 (e.g., the motion of lens 104, light sensor 106, and/or mirror 108) can, for example, have a constant acceleration. Additionally and/or alternatively, the motion of the portion of camera 102 can be based, at least in part, on the motion of bar code 115 (e.g., the predicted and/or expected motion of bar code 115), in a manner analogous to that previously described herein in connection with the motion of camera 102. As an additional example, in embodiments in which lens 104 is the portion of camera 102 in motion, the motion of lens 104 can be parabolic. However, embodiments of the present disclosure are not limited to a particular type of motion for the portion of camera 102.

As shown in FIG. 1, bar code reader 100 includes a processor 110. Processor 110 can be, for example, an image processor (e.g., a processor capable of image processing). Additionally, in some embodiments, bar code reader 100 can include a memory (not shown in FIG. 1 for clarity and so as not to obscure embodiments of the present disclosure).

The memory can store executable instructions, such as, for example, computer readable instructions (e.g., software), that can be executed by processor 110. The memory can be located in bar code reader 100 or internal to another computing resource (e.g., enabling computer readable instructions to be downloaded over the Internet or another wired or wireless connection).

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disc (DVD) or other optical disk storage, and/or a magnetic medium such as magnetic cassettes, tapes, or disks, among other types of memory.

Processor 110 can deblur (e.g., remove the motion blur from) the motion invariant image of bar code 115 produced by camera 102. Processor 110 can deblur the motion invariant image of bar code 115 by, for example, applying a deblurring function (e.g., a function that deblurrs a blurred image) to the motion invariant image. The deblurring function can include, for instance, a fixed image processing routine such as a deconvolution technique. However, embodiments of the present disclosure are not limited to a particular deblurring function.

As an example deblurring function, the motion blur in the motion invariant image can be modeled as the convolution of a latent deblurred (e.g., sharp) image I with a motion blur point spread function (PSF) B, giving the blurred motion invariant image $I_b$ as:

$$I_b = I * B + \eta$$

where $\eta$ represents noise. The motion blur PSF B caused, for example, by constant (negative) acceleration from a starting velocity v to an ending velocity −v is of the form:

$$B(i) = \begin{cases} 1/\sqrt{i} & \text{for } i = 1, 2, \ldots N, \\ 0 & \text{otherwise} \end{cases}$$

where N is the length of the PSF, which can be determined by calibration. The PSF B can be normalized to have unit power.

In some embodiments, processor 110 can deblur the motion invariant image of bar code 115 without determining or estimating the motion blur (e.g., the amount and/or PSF of the motion blur) in the motion invariant image. Accordingly, bar code reader 100 can read bar code 115 easier, faster, and/or cheaper than previous bar code readers (e.g., bar code readers that have to determine and/or estimate motion blur in an image of a moving bar code in order to read the bar code).

As shown in FIG. 1, bar code reader 100 includes a decoder 112. Decoder 112 can read the deblurred (e.g., sharp) motion invariant image of bar code 115. That is, decoder 112 can read (e.g., recognize and/or identify data represented by) bar code 115 in the motion invariant image that has been deblurred by processor 110.

Figure 2:
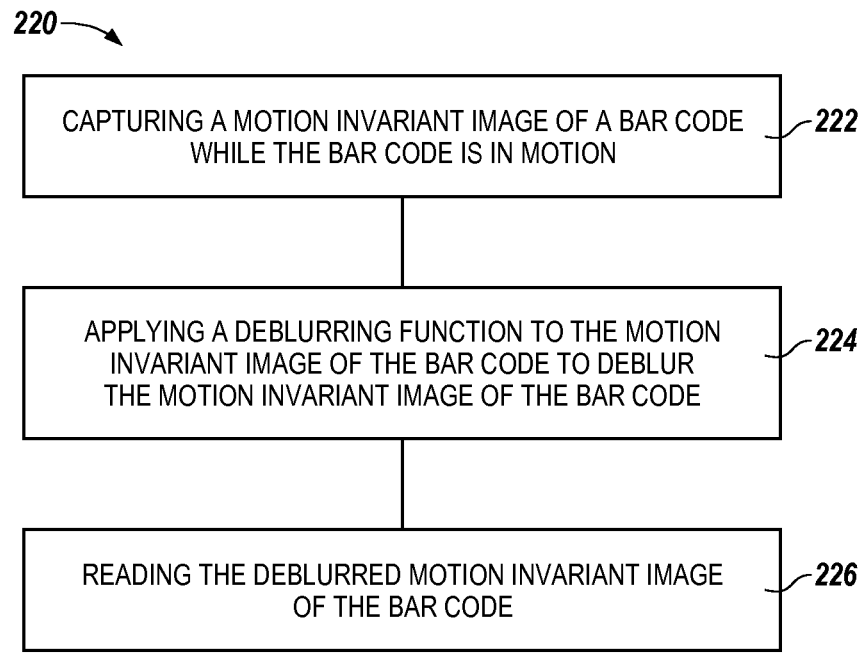
FIG. 2 illustrates a method of reading a bar code in accordance with one or more embodiments of the present disclosure.

FIG. 2 illustrates a method 220 of reading a bar code in accordance with one or more embodiments of the present disclosure. The bar code can be, for example, bar code 115 previously described in connection with FIG. 1. Method 220 can be performed, for example, by bar code reader 100 previously described in connection with FIG. 1.

At block 222, method 220 includes capturing a motion invariant image of a bar code (e.g., bar code 115) while the bar code is in motion. The motion invariant image can be analogous to the motion invariant image previously described in connection with FIG. 1, and can be captured in a manner analogous to that previously described in connection with FIG. 1. The motion of the bar code can be analogous to that previously described in connection with FIG. 1.

At block 224, method 220 includes applying a deblurring function (e.g., a function that deblurrs a blurred image) to the motion invariant image of the bar code to deblur the motion invariant image of the bar code. The deblurring function can be applied to the motion invariant image of the bar code in a manner analogous to that previously described in connection with FIG. 1.

At block 226, method 220 includes reading the deblurred (e.g., sharp) motion invariant image of the bar code. The deblurred motion invariant image of the bar code can be read in a manner analogous to that previously described in connection with FIG. 1.

In some embodiments, method 220 may not include determining or estimating the motion blur (e.g., the amount and/or PSF of the motion blur) in the motion invariant image. Accordingly, method 220 can be used to read a bar code easier, faster, and/or cheaper than previous bar code reading methods (e.g., bar code reading methods that include determining and/or estimating motion blur in an image of a moving bar code in order to read the bar code).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A bar code reader device, comprising:
  a camera configured to produce a motion invariant image of a bar code while the bar code is in motion, wherein the motion invariant image of the bar code is an image of the bar code having a motion blur that does not depend on the motion of the bar code; and
  a processor configured to deblur the motion invariant image of the bar code.

2. The device of claim 1, wherein the device includes a decoder configured to read the deblurred motion invariant image of the bar code.

3. The device of claim 1, wherein the camera is configured to produce the motion invariant image of the bar code while the camera is in motion.

4. The device of claim 3, wherein the motion of the camera has a constant acceleration.

5. The device of claim 3, wherein the motion of the camera is based, at least in part, on the motion of the bar code.

6. The device of claim 5, wherein a speed of the motion of the camera is approximately equal to a speed of the motion of the bar code.

7. The device of claim 5, wherein a direction of the motion of the camera is approximately equal to a direction of the motion of the bar code.

8. The device of claim 1, wherein:
  the bar code reader device includes a movable mirror configured to reflect light from the bar code to the camera; and
  the camera is configured to produce the motion invariant image of the bar code using the reflected light.

9. The device of claim 1, wherein the processor is configured to deblur the motion invariant image of the bar code without determining or estimating motion blur in the motion invariant image.

10. A method of reading a bar code, comprising:
  capturing a motion invariant image of a bar code while the bar code is in motion, wherein the motion invariant image of the bar code is an image of the bar code having a motion blur that does not depend on the motion of the bar code;
  applying a deblurring function to the motion invariant image of the bar code to deblur the motion invariant image of the bar code; and
  reading the deblurred motion invariant image of the bar code.

11. The method of claim 10, wherein the method does not include determining or estimating motion blur in the motion invariant image of the bar code.

12. The method of claim 10, wherein the deblurring function includes a fixed image processing routine.

13. The method of claim 10, wherein the bar code is a one-dimensional bar code.

14. The method of claim 10, wherein the bar code is a two-dimensional bar code.

15. A bar code reader device, comprising:
  a camera configured to produce a motion invariant image of a bar code while the bar code and a portion of the camera are in motion, wherein the motion invariant image of the bar code is an image of the bar code having a motion blur that does not depend on the motion of the bar code;

a processor configured to deblur the motion invariant image of the bar code; and a decoder configured to read the deblurred motion invariant image of the bar code.

16. The device of claim 15, wherein:

the camera includes a movable mirror; and the camera is configured to produce the motion invariant image of the bar code while the movable mirror is in motion.

17. The device of claim 15, wherein:

the camera includes a lens; and the camera is configured to produce the motion invariant image of the bar code while the lens is in motion.

18. The device of claim 15, wherein:

the camera includes a light sensor; and the camera is configured to produce the motion invariant image of the bar code while the light sensor is in motion.

19. The device of claim 15, wherein the motion of the portion of the camera is aligned with the motion of the bar code.

* * * * *